March 14, 1961 W. F. SHUPE 2,975,401
TOW TRUCK SAFETY LIGHT
Filed July 27, 1959 2 Sheets-Sheet 1
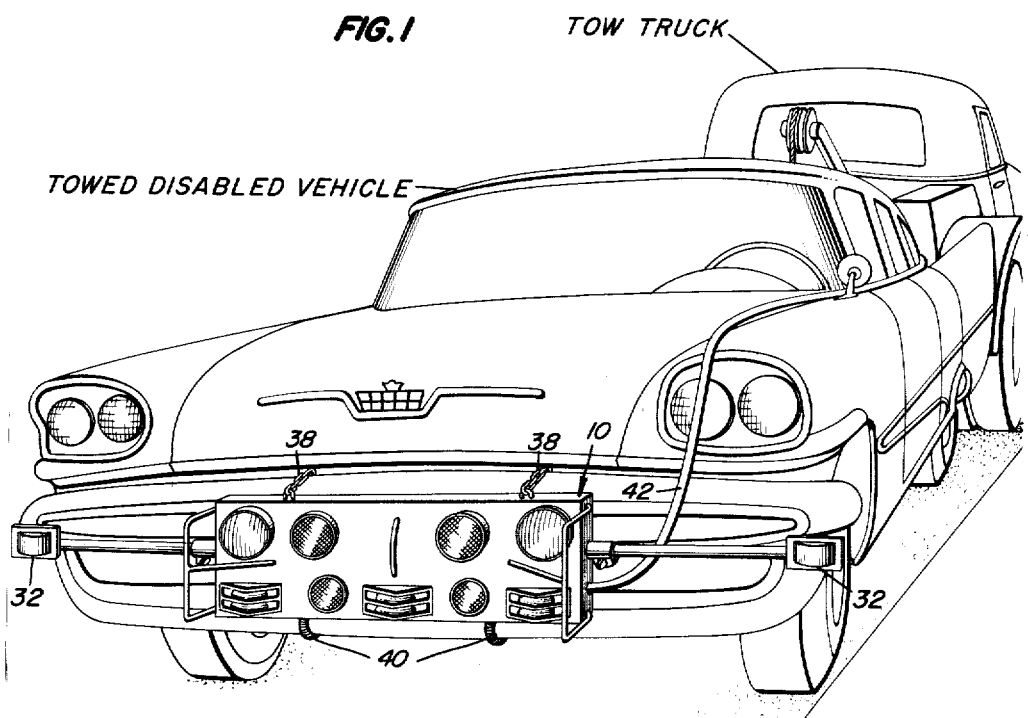
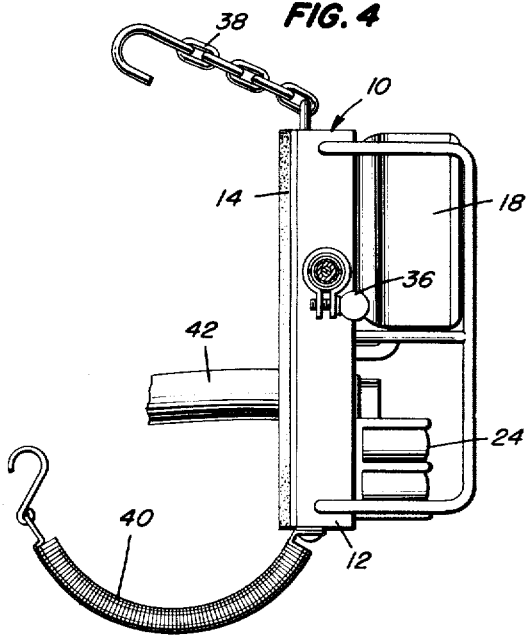
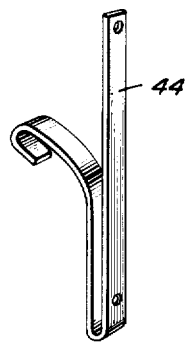
INVENTOR
William F. Shupe
BY Walter G. Finch
ATTORNEY

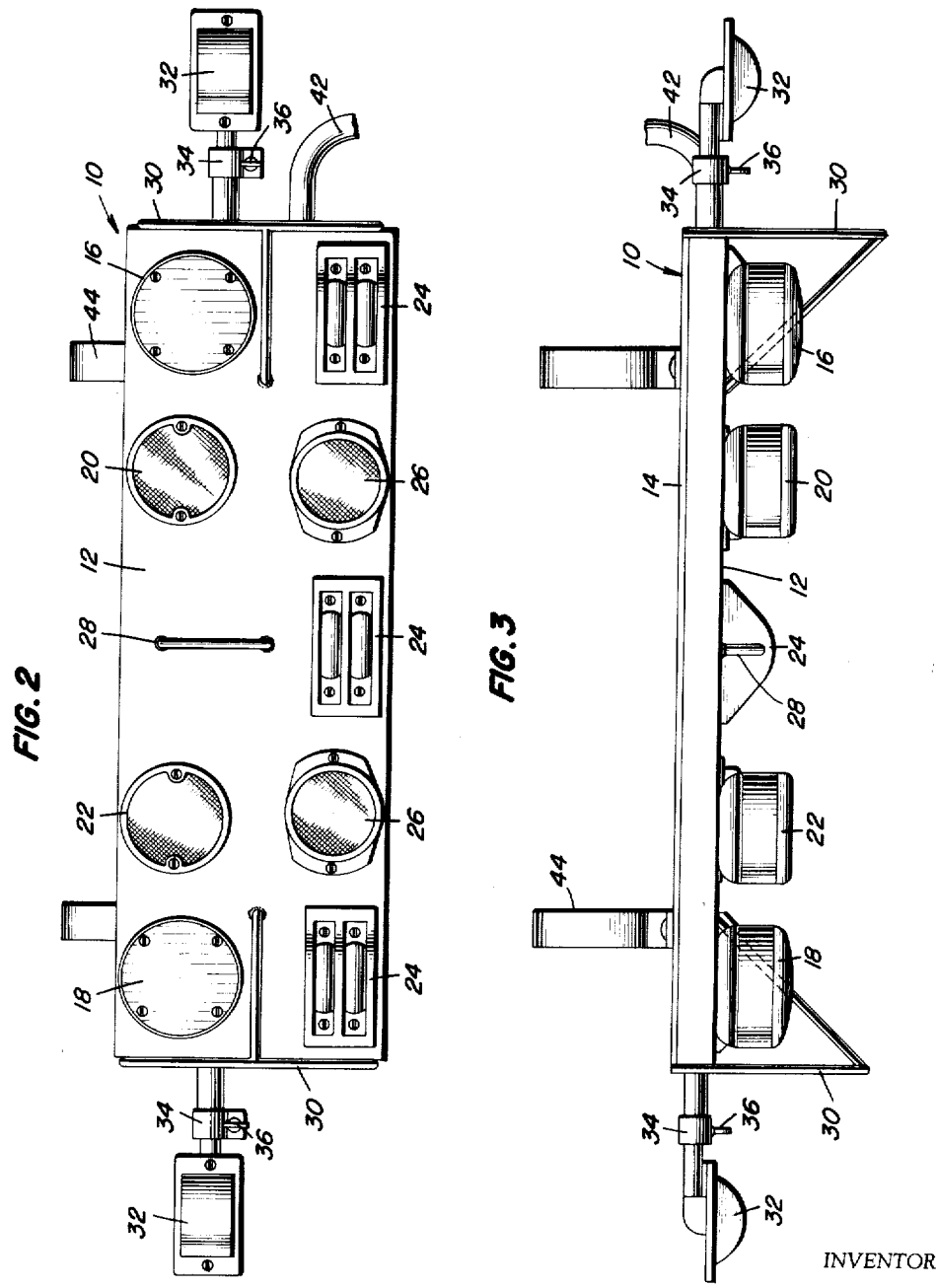

United States Patent Office 2,975,401
Patented Mar. 14, 1961

2,975,401
TOW TRUCK SAFETY LIGHT

William F. Shupe, 2962 Harford Road, Baltimore, Md., assignor of twenty-five percent to Molly Hash, Baltimore, Md.

Filed July 27, 1959, Ser. No. 829,625

2 Claims. (Cl. 340—84)

This invention relates generally to signal and indicator devices, and, more particularly, it pertains to a tail light arrangement for towed vehicles.

For reasons of safety, all vehicles moving along a roadway at night must be provided with tail lights. This is generally applicable to towed disabled vehicles. Therefore, various makeshift lanterns or other light sources have been employed.

There is a great need for a tail light arrangement in the towing industry which will meet the requirements of all situations, such as frontward towing and backward towing of large and small passenger vehicles, buses, trucks and trailers. Because of the state of disablement and lack of standardization in signal systems, the stop and rear lights, turn signal lights, backing lights, clearance lights, and the like of the towed vehicle are unavailable for use by the driver of the tow truck.

In the light of the foregoing, it is an object of the present invention, therefore, to provide a portable, readily attached safety signal light arrangement for towed, disabled vehicles which is versatile and operable by conventional controls of the tow truck.

Still other objects of this invention are to provide an emergency safety light unit for towed vehicles which is adjustable to the vehicle size and type and which remotely serves all the required signal requirements of any situation.

These and other objects and advantages of this invention will become more readily apparent and understood from the following specification and accompanying sheets of drawings in which:

Fig. 1 is a perspective view of a safety signal light unit in place on a towed vehicle incorporating the features of this invention;

Fig. 2 is a front elevation of the safety signal light unit of Fig. 1;

Fig. 3 is a top view of the safety signal light unit;

Fig. 4 is an end elevation of the safety signal light unit with the clearance lights being removed for clarity, and Fig. 5 is a perspective view of an optional bumper clip for use with the safety signal light unit.

Referring now to Figs. 2, 3, and 4 of the drawings, there is shown therein in three different views a safety signal light unit 10 having a shallow pan-like metal chassis 12. Chassis 12 is provided with a removable back 14 which may be externally cushioned or rubber covered. On the front face of chassis 12 are mounted a plurality of electric lamp assemblies consisting of a pair of turn signal lights 16 and 18 for right and left turn indication, respectively; a stop warning light 20 and a tail light 22. Three spaced warning lights 24 are also arranged in conventional large vehicle warning array, as shown in Figs. 1 and 3, and a pair of passive reflector lights 26 complete the face display of the chassis 12.

A handle 28 is provided at the center of gravity of the safety signal light unit 10 for convenient one-hand carry thereof. In addition, a pair of guards 30 are secured at the ends of the safety signal light unit 10 for rough handling protection of the glassware. A pair of width clearance lights 32 are also end mounted to the safety signal light unit 10.

Each light 32 is mounted on a telescopic tube assembly 34 which is provided with a locking thumbscrew 36. The lights 32 can thus be extended to the full width of a vehicle or the tube assembly 32 may be retracted within-itself and the chassis 12, as shown in Figs. 1 and 2 respectively.

By means of a pair of adjustable link chains 38 and a pair of coil springs 40 the safety signal light unit 10 may be hooked to a truck or trailer tailgate or vehicle grill or bumper as illustrated in Fig. 1. A multi-wire cable 42 is provided in sufficient length to plug into the electrical signalling system of the tow vehicle paralleling equivalent turn, stop, bar, and tail lights or otherwise connecting lights 16, 18, 20, 22, and 24 to suitable controlling switches available to the driver.

Where pleasure vehicles exclusively are to be towed, the chains 38 and spring 40 may be omitted and a pair of bumper clips 44 generally shaped as shown in Fig. 5 may be secured to the back 14 of the chassis 12.

Obviously, many other modifications and variations of the present invention are possible in light of the above-teachings. It is, therefore, to be understood that within the scope of the appended claims the invention may be practiced otherwise than as specifically described.

What is claimed is:

1. A tow safety light arrangement for towed vehicles, such as trucks and automobiles, comprising, an elongated rectangular shaped chassis of pan-like shape, a plurality of electric lamp assemblies mounted at the front of said chassis, means including an adjustable tube telescopic assembly having arms extending outwardly from opposite sides of said chassis to locate the width of the towed vehicle, each said adjustable tube telescopic assembly having a lamp assembly mounted at the outer end thereof, a pair of laterally spaced chains positioned at the top of said chassis and having one end of each connected to said chassis and the opposite ends thereof with a hook element for connection to a support member on said towed vehicle, and a corresponding pair of laterally spaced spring bias means positioned at the bottom of said chassis and having one end of each connected to said chassis and the opposite ends thereof with a hook element for connection to said support member, whereby said tow safety light arrangement can be securely attached to towed vehicles.

2. A safety light arrangement for towed vehicles, such as trucks and automobiles, comprising, structure defining a chassis, a plurality of lamp assemblies mounted on the forward face of said chassis, adjustable telescopic arms extending outwardly from the opposite sides of said chassis with a lamp assembly positioned at the end of each thereof to locate the width of the towed vehicle, a pair of laterally spaced chain members positioned at the top of said chassis and having one end of each connected to said chassis and the opposite end of each thereof with a hook element for connection to a support member on said towed vehicle, and a corresponding pair of laterally spaced spring means positioned at the bottom of said chassis and having one end of each connected to said chassis and the opposite ends of each with a hook element for connection to said support member, whereby said safety light arrangement can be securely connected to towed vehicles.

References Cited in the file of this patent

UNITED STATES PATENTS

| | | |
|---|---|---|
| 2,012,696 | Sorensen et al. | Aug. 27, 1935 |
| 2,584,292 | Rogers | Feb. 5, 1952 |
| 2,671,891 | Kent | Mar. 9, 1954 |

FOREIGN PATENTS

| | | |
|---|---|---|
| 304,615 | Italy | Jan. 12, 1933 |
| 757,609 | France | Dec. 9, 1933 |